United States Patent [19]

Edmonson et al.

[11] Patent Number: 5,232,566
[45] Date of Patent: Aug. 3, 1993

[54] UNDERLAYER DOPING IN THIN FILM MAGNETIC RECORDING MEDIA

[75] Inventors: David A. Edmonson; Kenneth E. Johnson; James J. Mayerle; Arthur C. Wall, all of Rochester, Minn.

[73] Assignee: International Business Machines Corporation, Armonk, N.Y.

[21] Appl. No.: 962,161

[22] Filed: Oct. 15, 1992

Related U.S. Application Data

[63] Continuation of Ser. No. 700,010, May 14, 1991, abandoned.

[51] Int. Cl.$^5$ ............................................. B05D 5/12
[52] U.S. Cl. ......................... 204/192.1; 427/131;
427/132; 427/250; 427/255.2; 427/255.3;
427/255.7; 427/295; 428/64; 428/336; 428/695;
428/900; 428/928
[58] Field of Search ............ 427/131, 132, 250, 255.2,
427/255.3, 255.7, 295; 428/64, 336, 695, 900,
928; 204/192.1

[56] References Cited

U.S. PATENT DOCUMENTS

| | | | |
|---|---|---|---|
| 4,231,816 | 11/1980 | Cuomo et al. | 148/31.55 |
| 4,640,755 | 2/1987 | Sato | 204/192.2 |
| 4,749,459 | 6/1988 | Yamashita et al. | 204/192.15 |
| 4,803,130 | 2/1989 | Skorjanec et al. | 204/192.2 |
| 4,828,905 | 5/1989 | Wada et al. | 427/131 X |

FOREIGN PATENT DOCUMENTS 0298840 1/1989 European Pat. Off. .
4023770 2/1991 Fed. Rep. of Germany .

Primary Examiner—Bernard Pianalto
Attorney, Agent, or Firm—Richard E. Billion; Homer L. Knearl

[57] ABSTRACT

The magnetic properties of a cobalt based, thin film, magnetic recording layer are controlled, independent of controlling the process for depositing the magnetic layer itself, by the introduction of process compatible dopant gases into an argon atmosphere during the vacuum deposition (i.e. a sputtering process or an evaporation process) of a chromium based underlayer upon which the magnetic layer is subsequently deposited. The same or a different dopant may also be introduced into the magnetic layer. The process compatible dopant gases described contain oxygen, nitrogen and/or carbon, and mixtures thereof, and include the group purified air, oxygen, nitrogen, a mixture of oxygen and nitrogen, carbon monoxide, carbon dioxide, methane and water vapor.

25 Claims, 16 Drawing Sheets

UNDERLAYER DOPING IN THIN FILM MAGNETIC RECORDING MEDIA

This application is a continuation of 07/700,060 filed May 14, 1991 and now abandoned.

TECHNICAL FIELD

This invention relates to the field of data processing, and more specifically to the production of thin film magnetic recording media, for example disks for use in disk files or direct access storage devices (DASD).

BACKGROUND OF THE INVENTION

The magnetic properties of thin film magnetic recording layers must be tightly controlled in order for the magnetic media, such as a rigid or hard recording disk, to be useful in the high density storage of digital data such as is used in conventional data processing installations.

Exemplary magnetic properties of thin film magnetic recording layers, such as are used to describe the hysteresis loop of a magnetic material, are the coercivity ($H_c$), the remanence ($M_r$), the remanence thickness product ($M_rT$), the squareness (S), and the coercive squareness ($S^*$).

A goal in the fabrication or manufacture of thin film magnetic recording media is to obtain bulk magnetic properties that are compatible with, and indeed are required by, the read/write transducing head of the data processing unit in which the media will be used. For example, the coercivity of a magnetic film is an effective measure of the magnetic field that is required from a transducing head in order to reverse the magnetization direction within the magnetic film.

A number of means have been practiced in the art to control the magnetic properties of thin film magnetic media. Examples are the use of different materials directly under the thin film magnetic layer (i.e. the use of an underlayer), variation in the thickness of the magnetic layer, and the use of different magnetic alloys in the magnetic layer. However, the art has generally not succeeded in controlling the bulk magnetic properties of thin film magnetic layers when a nonvariable set of material and thickness requirements are specified for the magnetic layer. A possible exception to this has been the use of variable preheating of the disk substrate. However, this preheating step may lead to other inconsistencies relative to magnetic remanence and/or warping of the disk.

U.S. Pat. No. 4,749,459, incorporated herein by reference, describes a number of ways by which the coercivity of a thin film magnetic recording layer may be controlled, including forming the magnetic film on a chromium underlayer and controlling the magnetic film's coercivity by controlling the thickness of the underlayer, controlling the amount of platinum in the magnetic layer, and sputter depositing the magnetic layer in an atmosphere that includes argon and a trace amount of a selected gas such as nitrogen, ammonia, or oxygen and nitrogen. U.S. Pat. Nos. 4,231,816, 4,640,775 and 4,803,130 describe the sputtering of metal alloys in an atmosphere containing a selected gas, including nitrogen.

While the various means practiced in the art for controlling the magnetic properties of thin film magnetic media have been generally useful, there remains a need in the art for a simple means whereby the magnetic properties of a thin film recording layer can be controlled in a manner that provides a great deal of disk manufacturing process latitude, independent of controlling parameters such as the thickness of the thin film magnetic layer.

SUMMARY OF THE INVENTION

The present invention relates to a reliable and a repeatable means for controlling the magnetic properties of thin film magnetic recording media by the introduction of a dopant gas, gases or vapors during the vacuum deposition process by which an underlayer for the magnetic film is deposited in the presence of an argon atmosphere. The dopant gas in accordance with the invention must be compatible with the process by which the chromium based underlayer is deposited in the presence of an argon atmosphere, and in accordance with the invention the dopant gas must contain oxygen, nitrogen and/or carbon. Exemplary dopant gases include oxygen, nitrogen, air, a mixture of oxygen and nitrogen, carbon monoxide, carbon dioxide, methane and water vapor.

Subsequently, the magnetic film is deposited on this doped underlayer. The same or a different dopant may also be introduction into the magnetic layer. The invention finds utility when used with either rigid or flexible magnetic recording media.

Without limitation thereto, the magnetic parameters that are controlled in accordance with the invention are coercivity ($H_c$), remanence ($M_r$) and coercivity squareness ($S^*$).

The crystallography and grain structure of a chromium based underlayer is known to play a major role in determining the bulk magnetic properties of an overlying cobalt based magnetic alloy film.

In accordance with the invention, the crystallography, grain structure and bulk magnetic parameters or properties of a thin film magnetic recoding layer are controllable generally independent of the type of magnetic material that is deposited as the thin magnetic film, and generally independent of the thickness of the thin magnetic film.

More specifically, the objects and advantages of the invention are accomplished by the gaseous doping of a chromium based underlayer with a process compatible gas or vapor containing oxygen, nitrogen and/or carbon, of which the group oxygen, nitrogen, purified air, for example a mixture of 20% oxygen and 80% nitrogen, carbon monoxide, carbon dioxide, methane and water vapor. Examples of such chromium based underlayers, without limitation thereto, are Cr, CrW, CrV and CrNb. Subsequently, the thin film magnetic recording layer is deposited on this doped Cr based underlayer.

The present invention provides a very simple means whereby the bulk magnetic properties of the overlying thin film recording layer can be controlled without placing restrictions on the magnetic layer or upon the deposition process by which the magnetic layer is deposited on the underlayer.

The thin film magnetic recording layers with which the invention finds utility are vacuum deposited, cobalt based, magnetic recording layers, for example sputter deposited or evaporative deposited thin films. An exemplary composition for such a cobalt based thin film is Co75/Pt12/Cr13. Other metals useful in cobalt based magnetic recording layers include Ni and Ta.

An important utility of the invention is to produce a target coercivity, remanence, and/or squareness property for a cobalt based recording layer by controlling the doping of the layer's underlayer, so as to either increase or decrease these magnetic properties as is needed to meet the target values.

An object of the invention is to provide a method of film magnetic recording layer wherein a substrate member for the recording layer is first provided with a vacuum deposited, chromium based, underlayer, the underlayer being doped with a process compatible dopant gas that contains oxygen, nitrogen and/or carbon, preferably selected from the group oxygen, nitrogen, a mixture of oxygen and nitrogen, carbon monoxide, carbon dioxide, methane and water vapor, the thin film magnetic recording layer then being vacuum depositing onto this chromium based underlayer.

In an embodiment of the invention this chromium based underlayer is sputter deposited onto the substrate means from a hot isostatically pressed (HIPED), vacuum cast or other high purity target member in the presence of argon gas and the selected dopant gas or vapor.

As will be apparent, selection of the dopant gas from the group nitrogen, a mixture of oxygen and nitrogen, methane, carbon monoxide or carbon dioxide enables the coercivity of the thin film recording layer to be decreased, whereas selection of oxygen or water vapor as the dopant gas enables the coercivity of the thin film recording layer to be increased.

Also as will be apparent, when it is desired to decrease the hysteresis loop squareness of the thin film recording layer, the selected dopant gas may be nitrogen, air carbon monoxide carbon dioxide or methane.

These and other objects and advantages of the invention will be apparent to those of skill in the art upon reference to the following detailed description, which description makes reference to the drawing.

DETAILED DESCRIPTION OF THE INVENTION

Figure 1:
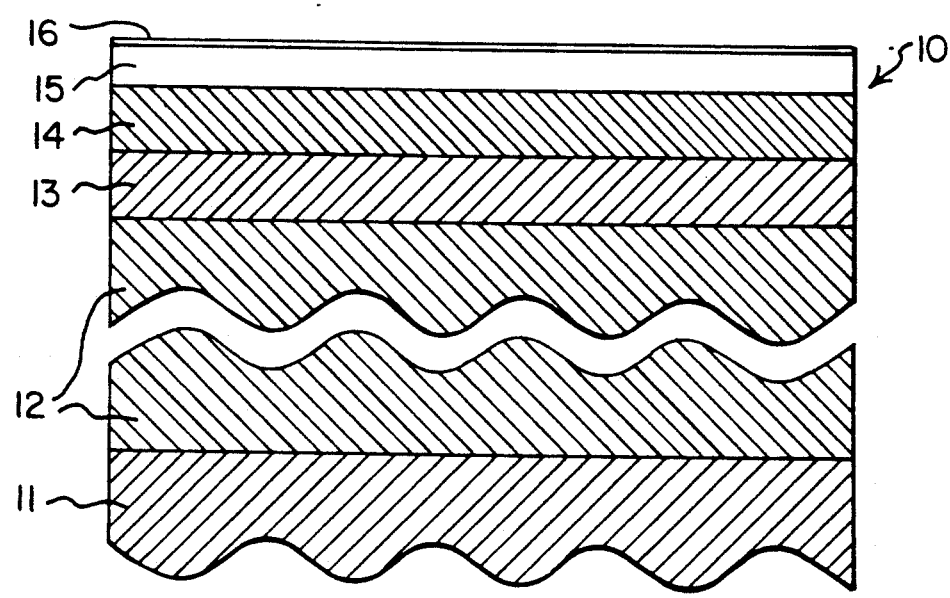
FIG. 1 is a side section view of a portion of a rigid thin film magnetic recording disk embodying the invention.

The present invention provides a method and an apparatus for easily controlling the magnetic properties, such as coercivity, remanence and coercivity squareness, of a thin magnetic recording film.

An exemplary use of the invention is to produce a rigid magnetic recording disk for use in direct access data storage devices (DASD), also called disk files.

By way of the invention the macromagnetic characteristics of a recording film are controlled by doping the underlayer upon which the recording film is subsequently deposited. During subsequent deposition of the recording film, the recording film's micromagnetic properties are controlled as desired. In this way, magnetic recording media is produced having magnetic properties that are compatible with the read/write transducing head with which the media will be used during conventional data processing. In addition, the present invention extends the manufacturing process options that are available for obtaining the magnetic properties such as coercivity and remanence thickness product that may be needed in a specific head/media environment.

In accordance with the invention a cobalt based recording film is deposited on a chromium based underlayer that contains a dopant that is compatible with the process by which the underlayer was deposited. Underlayer doping is produced by vacuum depositing the underlayer from an argon atmosphere that contains a small percentage of a process compatible dopant gas or vapor that contains oxygen, nitrogen and/or carbon, or mixtures thereof, the dopant preferably being selected from the group oxygen, nitrogen, purified air comprising nitrogen as the major constituent, carbon monoxide, carbon dioxide, methane and water vapor, with nitrogen being the preferred dopant gas due to the manufacturing process latitude that its use provides. Sputter deposition is the preferred manner of depositing the underlayer.

In accordance with a feature of the invention, a dopant may also be introduced into the magnetic layer, to aid in controlling its micromagnetic properties. Sputter deposition is also the preferred manner of depositing the magnetic layer.

As will be readily appreciated by those skilled in the art, it is desirable that the bulk magnetic properties of a thin film recording layer (i.e. the macromagnetic properties) be controllable independent of controlling the type of magnetic material within the thin film, and independent of controlling the thickness of the magnetic thin film. The present invention provides a very simple means of accomplishing this result.

Underlayer doping in accordance with the invention is accomplished by introducing a controlled amount of the selected doping gas or vapor into the vacuum deposition chamber as the underlayer is sputter deposited from a chromium based target. The dopant gas is mixed with an argon sputtering gas prior to the mixture entering the deposition chamber. For a given deposition rate, the ratio of the dopant gas to the argon gas (i.e. expressed as a percentage of dopant gas or parts per million, i.e. ppm) determines the extent of doping that will occur in the underlayer, and the magnetic property control effect that the underlayer will have upon the subsequently deposited cobalt based recording film.

FIG. 1 is a side section view of a portion of such a rigid magnetic recording disk 10 embodying the invention. In this figure reference numeral 11 identifies the disk's rigid, disk shaped, nonmagnetic substrate member in the form of an aluminum disk of the type well known to those of skill in the art. As is conventional, substrate member 11 is preferably plated or sputtered with a coating such as NiP coating 12.

NiP coating 12 is conventionally polished to provide a smooth, flat surface. A form of roughness, commonly called a texture, may also be added to this NiP surface.

In accordance with the invention, NiP coating 12 is now coated with a vacuum deposited underlayer coating 13, for example to a thickness in the range of from about 25 to about 4,000 angstroms, for example about 250 angstroms. Coating 13 is doped during the deposition process with a dopant gas that is selected from the group oxygen, nitrogen, and a mixture of oxygen and nitrogen, the mixture's major constituent being nitrogen, for example 20% oxygen and 80% nitrogen, carbon monoxide, carbon dioxide, methane, and water vapor. Preferably, underlayer coating 13 is a sputter deposited, chromium based coating that is deposited onto coating 12 in the presence of argon gas and the selected process compatible dopant gas or vapor.

As a feature of the invention, underlayer film 13 is a material selected from the group Cr, CrW, CrV and CrNb, with Cr being the preferred material.

Underlayer film 13 is now coated with a vacuum deposited, cobalt based, thin film magnetic recording layer 14. Exemplary cobalt based magnetic films 14, without limitation thereto, include CoPtCr, CoTaCr, CoNiCr and CoTaPtCr. While the thickness of recording layer 14 is not critical to the invention, a thickness in the range of about 25 to 1,000 angstroms is preferred, and an exemplary thickness is about 650 angstroms.

Preferably, thin magnetic film 14 is a sputter deposited film that is deposited onto underlayer 13 in the presence of an argon gas, or alternatively in the presence of an argon gas and a dopant that is selected from the group oxygen, nitrogen, a mixture of oxygen and nitrogen, the mixture's major constituent being nitrogen, for example 20% oxygen and 80% nitrogen, carbon monoxide, carbon dioxide, methane, and water vapor.

As a feature of the invention, thin film magnetic layer 14 comprises Co/Pt/Cr, for example Co75/Pt12/Cr13.

As is well known by those skilled in the art, it is necessary to adequately control the residual or dopant gases that are present in the deposition chamber during the time interval between the deposition of layers 13 and 14.

Disk 10 may also include a carbon based overcoat layer 15 and a lubricant layer 16, as is well known to those of skill in the art.

Figure 2:
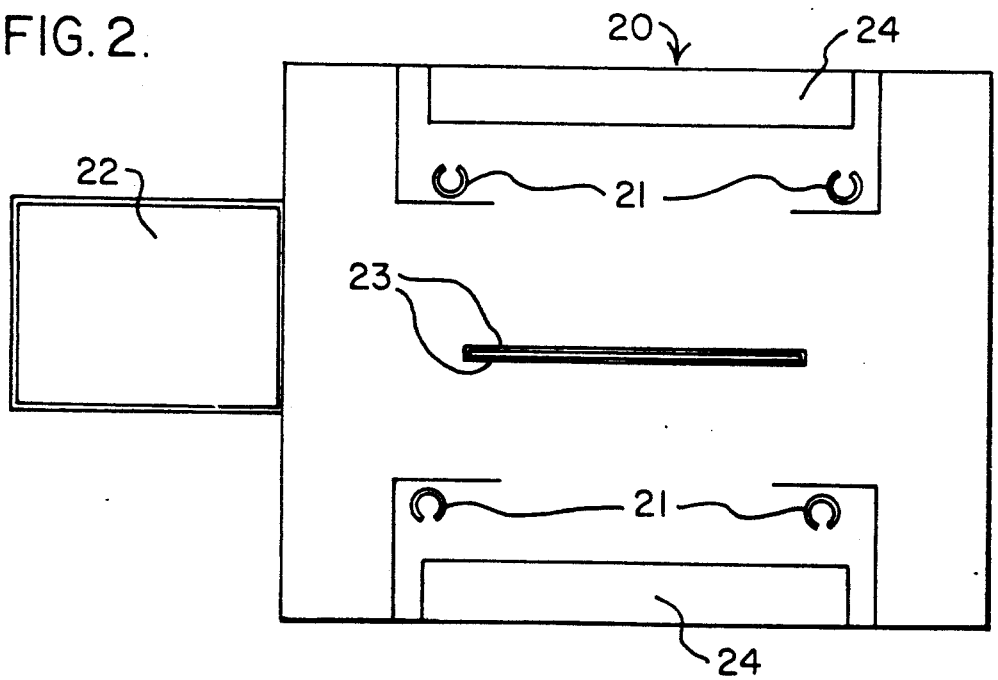
FIG. 2 is a simplified view of a sputtering chamber in which the doped chromium based underlayer and the doped or undoped cobalt based thin film of the present invention are sequentially sputter deposited on the NiP coating that is carried by the aluminum substrate member of FIG. 1, FIG. 2 showing only one of several target members that are necessary in accordance with the invention.

As noted previously, the preferred means whereby underlayer 13 and thin magnetic film 14 are deposited during the manufacture of disk 10 is that of sputter deposition. FIG. 2 is a simplified view of a sputtering chamber 20 in which the doped chromium based underlayer 13 and the doped or undoped cobalt based thin film 14 are sequentially sputter deposited on the NiP coating 12 that is carried by aluminum substrate member 11 of FIG. 1.

In FIG. 2 a mixture of argon and the selected dopant gas or vapor, for example nitrogen, enter chamber 20 by way of a number of stainless steel inlet conduits 21, and exit the chamber, with a reduced concentration of nitrogen therein, by way of pump 22. The disk's NiP coated aluminum substrate member is shown at 23 in FIG. 2.

Reference numeral 24 identifies chromium based targets from which underlayer 13 of FIG. 1 is sputter deposited, in a manner well known to those of skill in the art. Targets 24 from which underlayer 13 is sputter deposited are preferably of a very high purity, for example in the range of about 99.9 percent pure or higher. While powder pressed targets 24 can be used, in accordance with a feature of the invention targets 24 are highly pure and uniformly consistency vacuum cast or hot isostatically pressed target (i.e HIPED targets) that do not have the imbedded impurities sometimes found in powder pressed targets. The manner in which these high levels of purity are obtained are well known to those of skill in the art and are not critical to the invention.

Reference numerals 24 also represent cobalt based targets from which magnetic film 14 of FIG. 1 is sputter deposited onto underlayer 13, in a manner well known to those of skill in the art. Targets 24 from which magnetic film 14 is sputter deposited are also of a very high purity, and are preferably vacuum cast or HIPED targets.

When such a high purity target, for example a Co75/Pt12/Cr13 target, is used to sputter deposit magnetic film 14 of FIG. 1, the result is often a recording film having an excessively high coercivity relative to the requirements of the transducing head with which disk 10 will be used. In this case, the doping of underlayer 13 in accordance with the invention is used to reduce this coercivity to the target level that is required by the transducing head.

Those skilled in the art are aware of the fact that a recording media underlayer, such as Cr underlayer 13, can be deposited as an unusually thick film for the purposes of producing a favorable recording media noise characteristic. However, when such a thick underlayer structure is provided for the purpose of producing media having a low noise characteristic, it is often found that the media's coercivity is now too high for the media's intended use. An additional benefit that is provided by the present invention is that doping of underlayer 13 can be used to reduce this high coercivity to a target level such as is required by the media's intended use.

In an exemplary embodiment of the invention substrate member 11 of FIG. 1 was a polished Al(Mg) disk 130 mm in diameter and 75 mils thick, plated with a NiP layer 12 about 12 micro meters thick. Layer 12 was then textured with circumferential scratches, in order to aid in the tribological performance of the head-to-disk interface, and in order to provide reduced magnetic variability around the circumference of the finished disk.

Quartz lamps were used to degas and heat the NiP coated substrate member prior to sputter disposition. Radiation heaters may be used, perhaps in conjunction with the use of quartz lamps.

During sputter deposition of layers 13 and 14, the deposition temperature was held in the range of about 100 to 210 degrees C., with 180 degrees C. being the preferred temperature. The base pressure of deposition chamber 20 was first reduced to generally less than $1 \times 10^{-6}$ torr. The chamber was then back filled with the argon-dopant gas mixture to a total pressure in the range of about 4 to 50 mtorr, with the pressure range from about 4 to 25 mtorr being preferred. The power delivered to targets 24 during deposition was about 1 kwatt for rectangular targets that were about $4.75 \times 15$ inches in size.

The optimum deposition rate for layers 13 and 14 was in the range of about 500 to 3,000 angstroms per minute, with about 1,000 angstroms per minute being preferred.

A chromium based underlayer 13 was sputter deposited onto NiP layer 12 to a thickness of about 250 angstroms, followed by the sputter depositing of a Co75/Pt12/Cr13 layer 14, about 650 angstroms thick.

Manufacture of disk 10 was then completed by providing a carbon overcoat layer 15, about 300 angstroms thick, and a lubricant layer 16.

Figure 4:
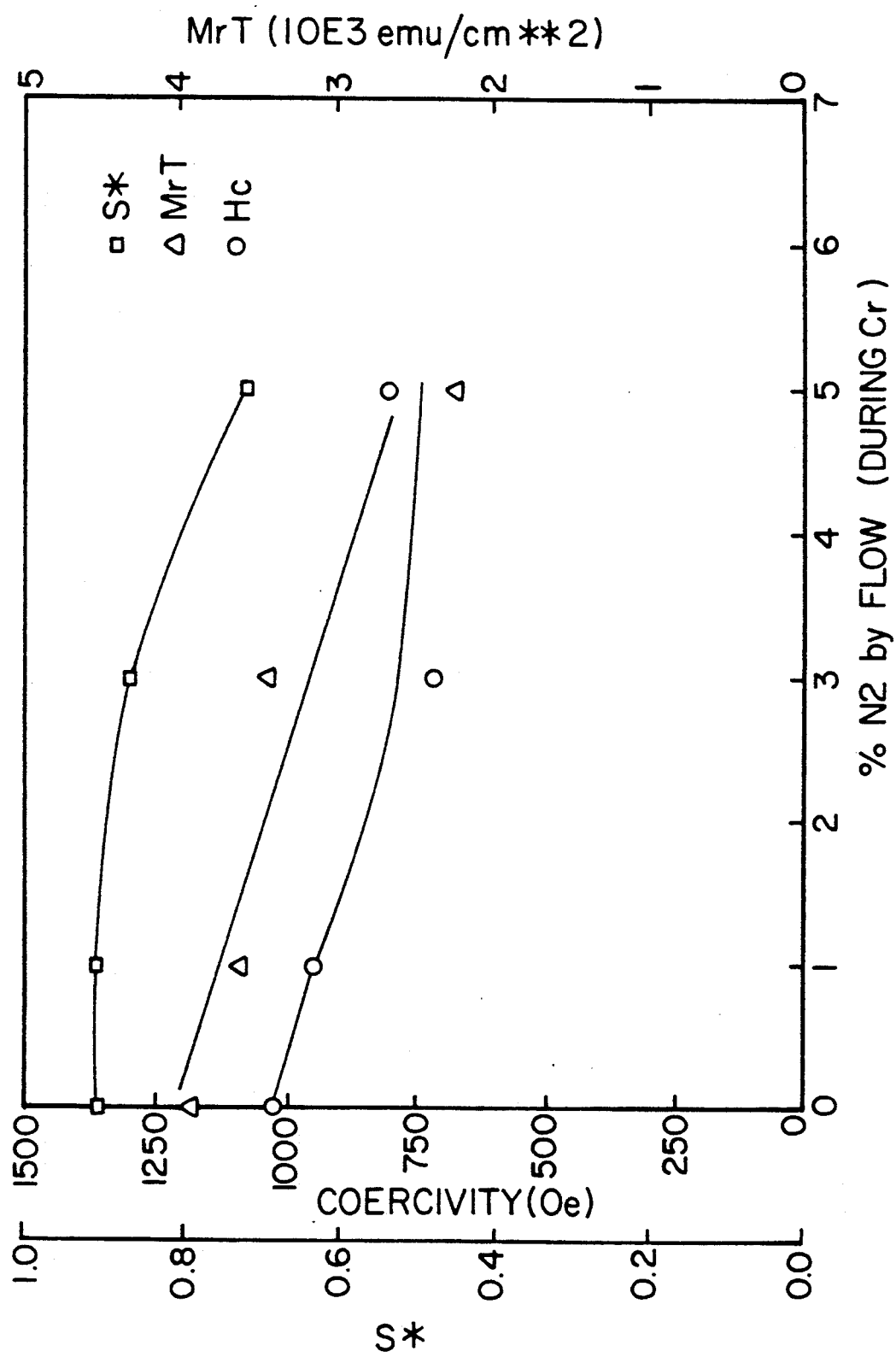
FIG. 4 is a graph that shows how the bulk magnetic properties of the thin film magnetic recording film of FIG. 1 can be controlled by varying the nitrogen/argon ratio in the gas flow that enters the sputtering chamber of FIG. 2 during only the deposition of the chromium based underlayer of FIG. 1.

As stated previously, magnetic thin film 14 of FIG. 1 can be sputter deposited using the chamber of FIG. 2 when the chamber contains a pure argon atmosphere, or alternatively when the chamber contains an atmosphere comprising argon as the major constituent, the remainder being a selected process compatible dopant gas. While not critical to the invention, usage of a mixture of nitrogen and oxygen usually includes nitrogen as the major constituent, the remainder being oxygen. Use of a doped argon atmosphere during the sputter deposition of magnetic film 14 enables control of the film's magnetic properties as is shown in FIG. 4.

Figure 3:
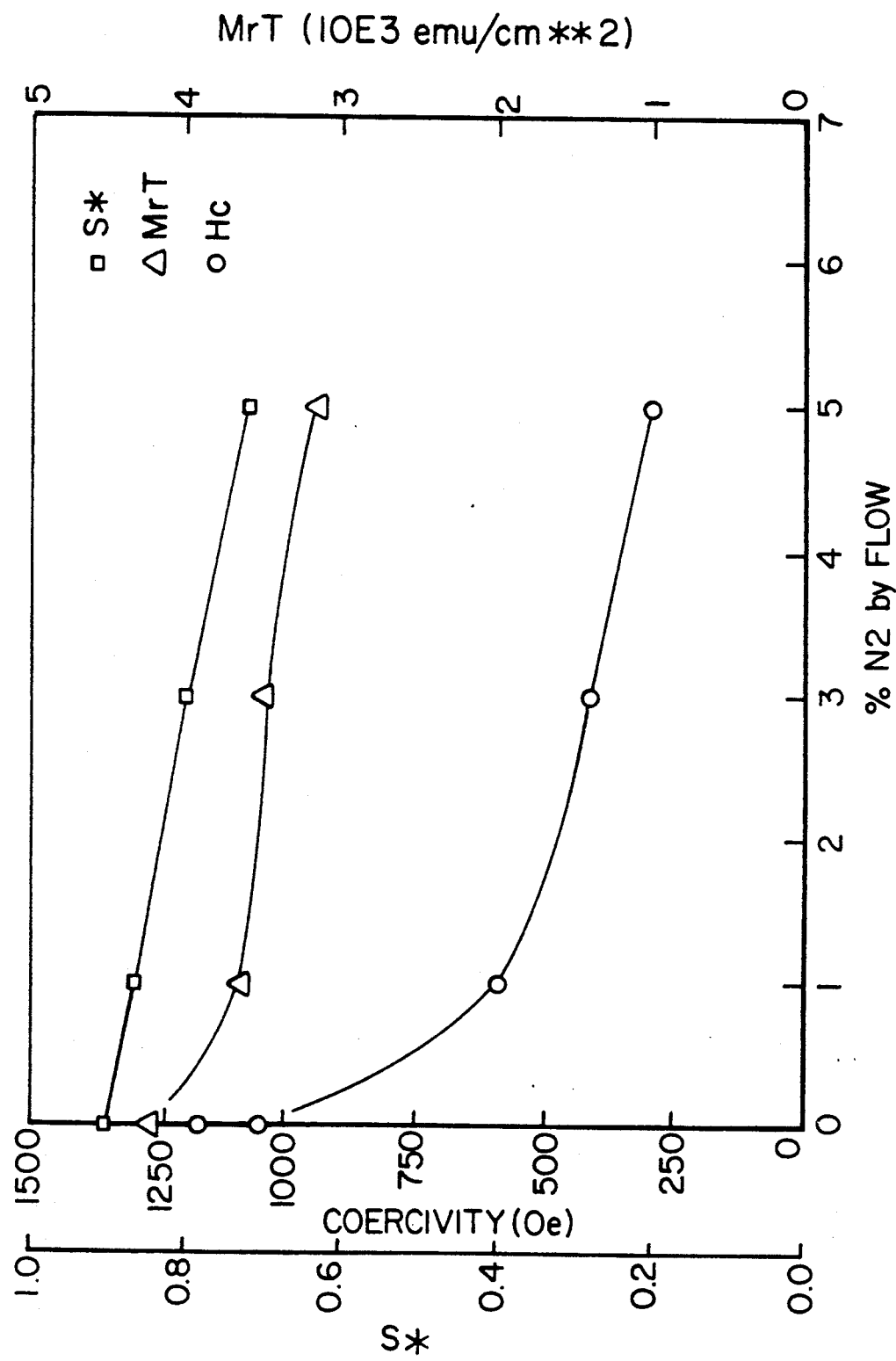
FIG. 3 is a graph that shows how the bulk magnetic properties (i.e. the Hc, MrT and S*) of the thin film magnetic recording film of FIG. 1 can be controlled by varying the nitrogen/argon ratio in the gas flow that enters the sputtering chamber of FIG. 2 during the deposition of the chromium based underlayer and the cobalt based thin film of FIG. 1.

FIG. 3 is a graph that shows how the bulk magnetic properties of thin film magnetic recording film 14 of FIG. 1 can be controlled by varying the nitrogen/argon ratio in the gas flow that enters sputtering chamber 20 of FIG. 2 during the deposition of chromium based underlayer 13 and during deposition of cobalt based thin film 14.

This graph shows that the three magnetic hysteresis loop parameters squareness (S*), coercivity (Hc) and remanence thickness product (MrT) all reduce in magnitude as a function of increasing the content of nitrogen doping within the argon sputtering gas during deposition of underlayer 13 and magnetic film 14. However, for low doping levels the film's coercivity reduces more rapidly than do the other two magnetic parameters.

The layer thickness used in the magnetic recording media of FIG. 3 was generally typical of the invention. The chromium based underlayer was pure chromium of a thickness about 250 angstroms. The cobalt based magnetic recording layer was Co75/Pt13/Cr13, of a thickness about 650 angstroms. Thus, the changes that are shown in MrT reflect the changes that occur in Mr.

In accordance with the invention, only chromium based underlayer 13 need be doped as described.

FIG. 4 is a graph that shows how the magnetic properties of thin film magnetic recording film 14 of FIG. 1 can be controlled by varying the nitrogen/argon ratio in the gas flow that enters the sputtering chamber of FIG. 2 during only the deposition of chromium based underlayer 13 of FIG. 1, magnetic layer 14 thereafter being deposited using a pure argon atmosphere. FIG. 4 demonstrates that the indicated magnetic properties decrease as the percentage of nitrogen increases.

Figure 5:
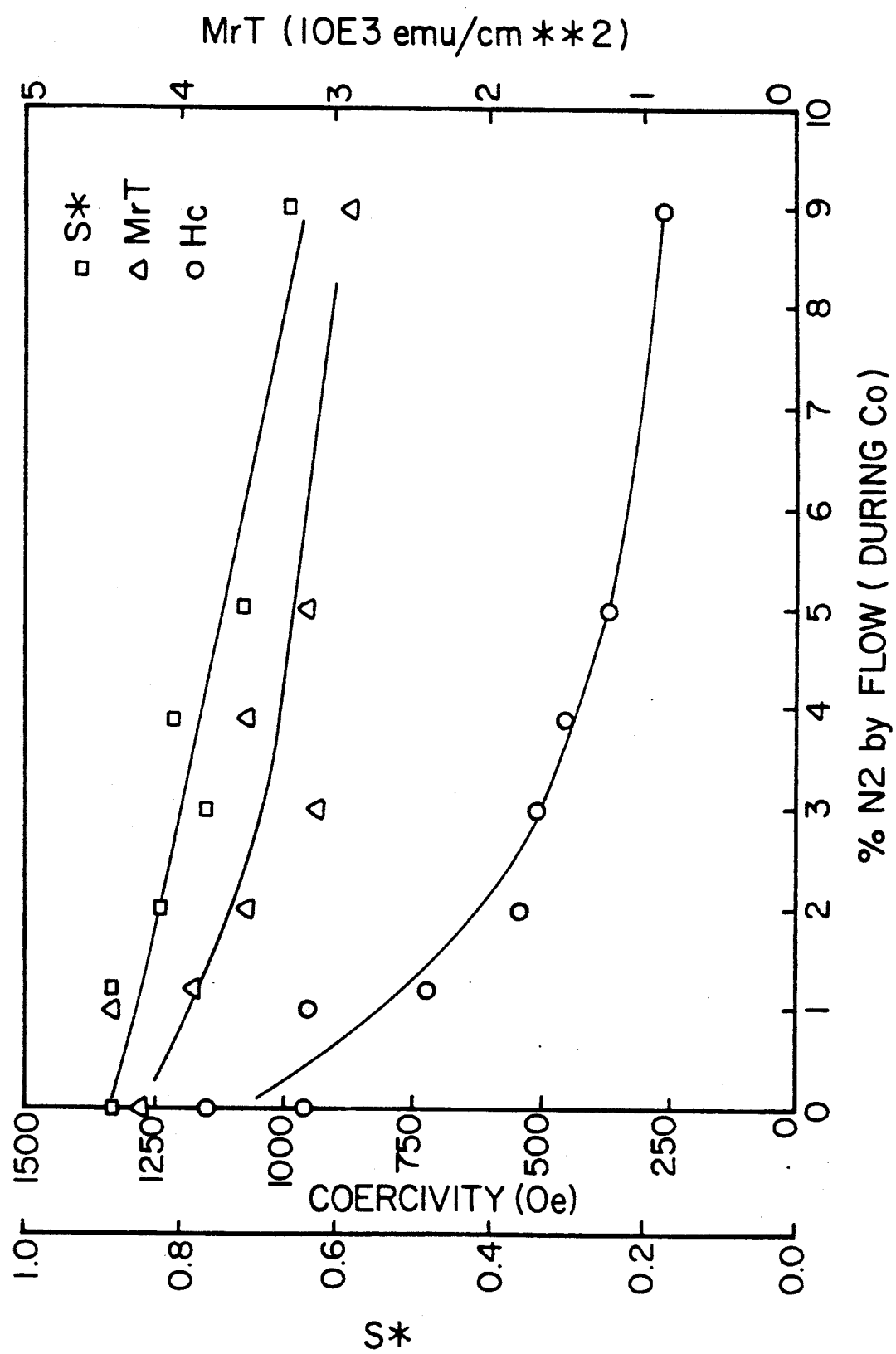
FIG. 5 is a graph that shows how the bulk magnetic properties of the thin film magnetic recording film of FIG. 1 can be controlled by varying the nitrogen/argon ratio in the gas flow that enters the sputtering chamber of FIG. 2 during only the deposition of the cobalt based thin film of FIG. 1.
Figure 6:
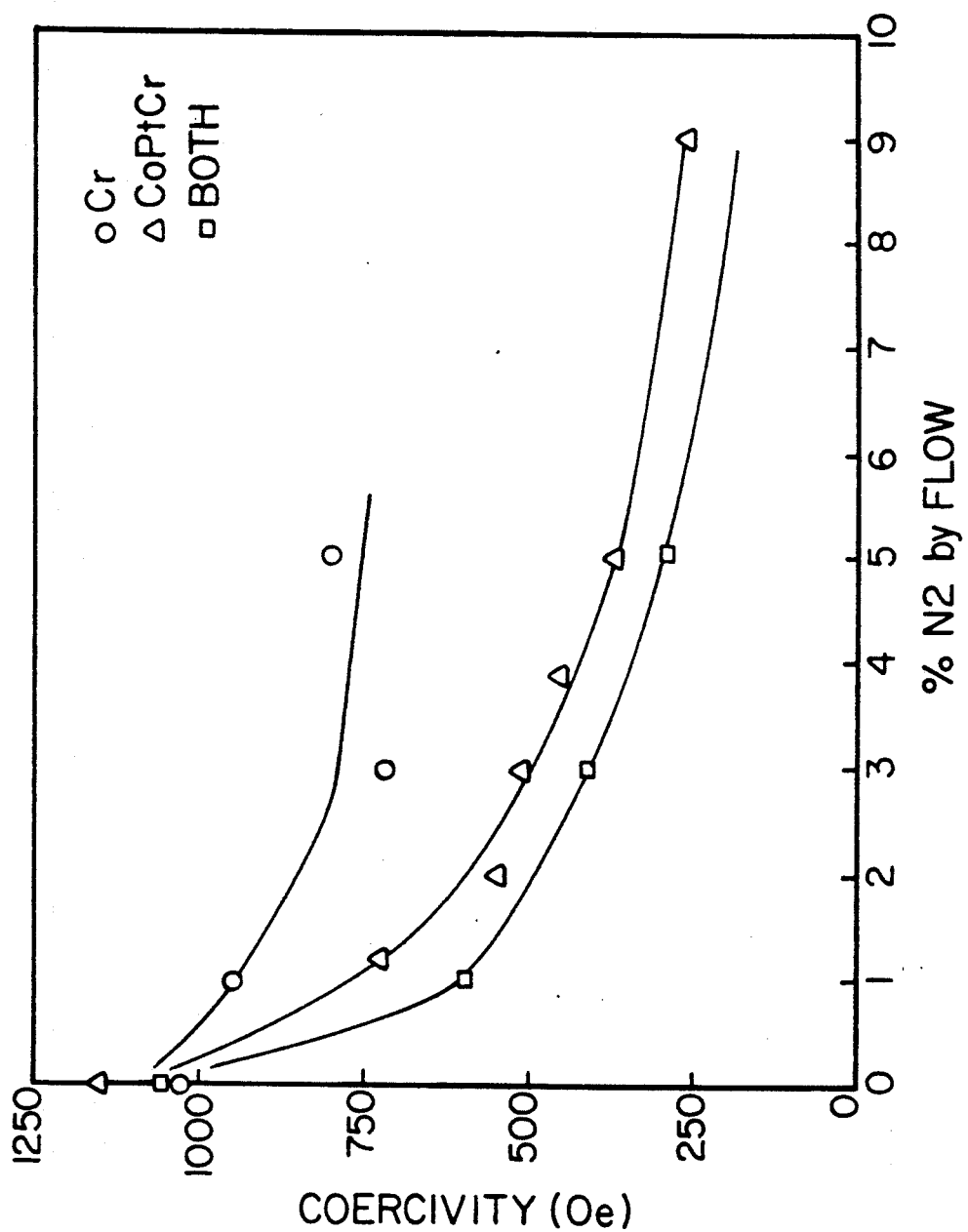
FIG. 6 is a graph that compares the coercivity of the cobalt based thin film of FIG. 1, (1) when only the chromium based underlayer is doped by varying the nitrogen/argon ratio in the gas flow that enters the sputtering chamber of FIG. 2, (2) when only the cobalt based thin film is doped by varying the nitrogen/argon ratio in the gas flow that enters the sputtering chamber of FIG. 2, and (3) when both the chromium based underlayer and the cobalt based thin film are doped by varying the nitrogen/argon ratio in the gas flow that enters the sputtering chamber of FIG. 2.

FIG. 5 shows that the magnetic properties of thin film magnetic recording film 14 of FIG. 1 can be controlled by varying the nitrogen/argon ratio in the gas flow that enters the sputtering chamber of FIG. 2 during only the deposition of cobalt based thin film 14. Again it is shown that the indicated magnetic properties decrease as the percentage of nitrogen increases. Since, on the average, coercivity is the most strongly affected of the three magnetic parameters Hc, MrT and S*, FIG. 6 is presented to compare the effect that nitrogen doping has on coercivity for the three doping possibilities of (1) doping chromium based underlayer 13 alone, (2) doping only cobalt based recording layer 14, and (3) doping both of the layers 13 and 14. A slow rate of change effect is seen when doping underlayer 13 only, and the most rapid effect is obtained when doping both of the layers 13 and 14. Generally, it appears that doping both of the layers 13 and 14 produces the sum of the change that is produced by doping only the individual layers 13 and 14.

Microstructure analysis of an undoped and a nitrogen doped underlayer 13 using a transmission electron microscope revealed that a reduction in average grain size occurred as a result of nitrogen doping.

A valuable utility of the present invention enables those skilled in the art to either increase or decrease the coercivity of magnetic recording layer 14 of FIG. 1, and to in this way tailor the bulk magnetic properties of layer 14 so as to match the properties that are required by the transducing head with which disk 10 will be used. This feature of the invention is shown in FIGS. 3-9.

Figure 7:
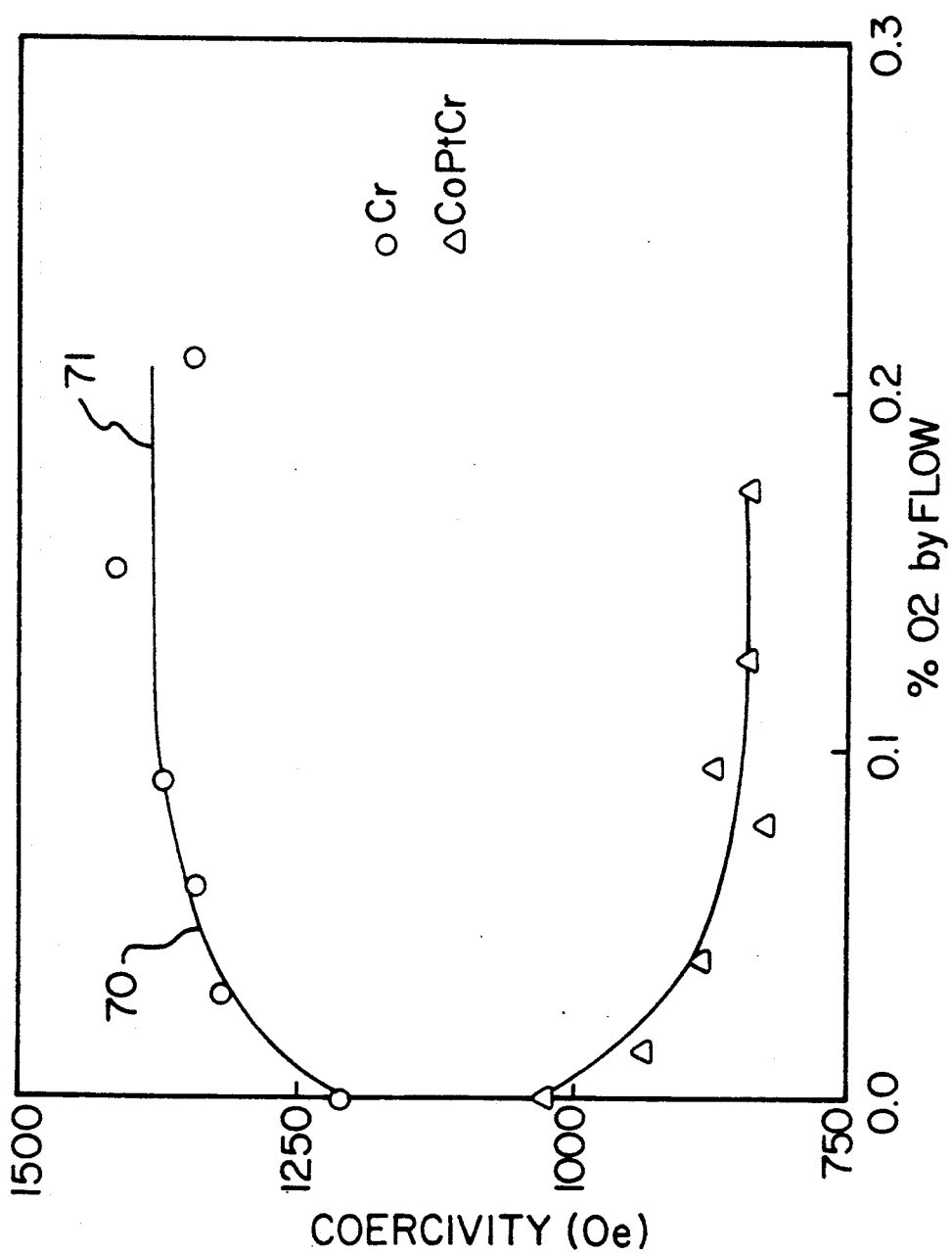
FIG. 7 is a graph that compares the coercivity of the cobalt based thin film of FIG. 1, (1) when only the chromium based underlayer is doped by varying the oxygen/argon ratio in the gas flow that enters the sputtering chamber of FIG. 2, and (2) when only the cobalt based thin film is doped by varying the oxygen/argon ratio in the gas flow that enters the sputtering chamber of FIG. 2.

In FIG. 7 the upper curve shows how the coercivity of cobalt based thin magnetic film 14 of FIG. 1 can be increased in accordance with the invention by varying the oxygen dopant flow rate relative to 100 sccm flow rate of argon during the sputter deposition of chromium based underlayer 13 of FIG. 1. Magnetic film 14 was sputter deposited without doping from a pure argon atmosphere for the data shown in the upper curve of FIG. 7. From this upper curve it can be seen that the control range for coercivity exists in the low doping and sloped portion 70 of the curve (i.e. generally less than 0.1% doping). Within this control region, the coercivity of magnetic film 14 can be increased by increasing the amount of oxygen doping of the argon sputtering gas. The coercivity generally saturates at portion 71 of the curve. The magnetic film's MrT characteristic showed little change when using oxygen doping. As will be apparent to those of skill in the art, the same general effect shown in FIG. 7 can be obtained when the dopant gas comprises water vapor ($H_2O$).

The lower curve of FIG. 7 shows how oxygen doping of only cobalt based magnetic recording layer 14 can be used to reduce the coercivity of this recording layer.

Figure 8:
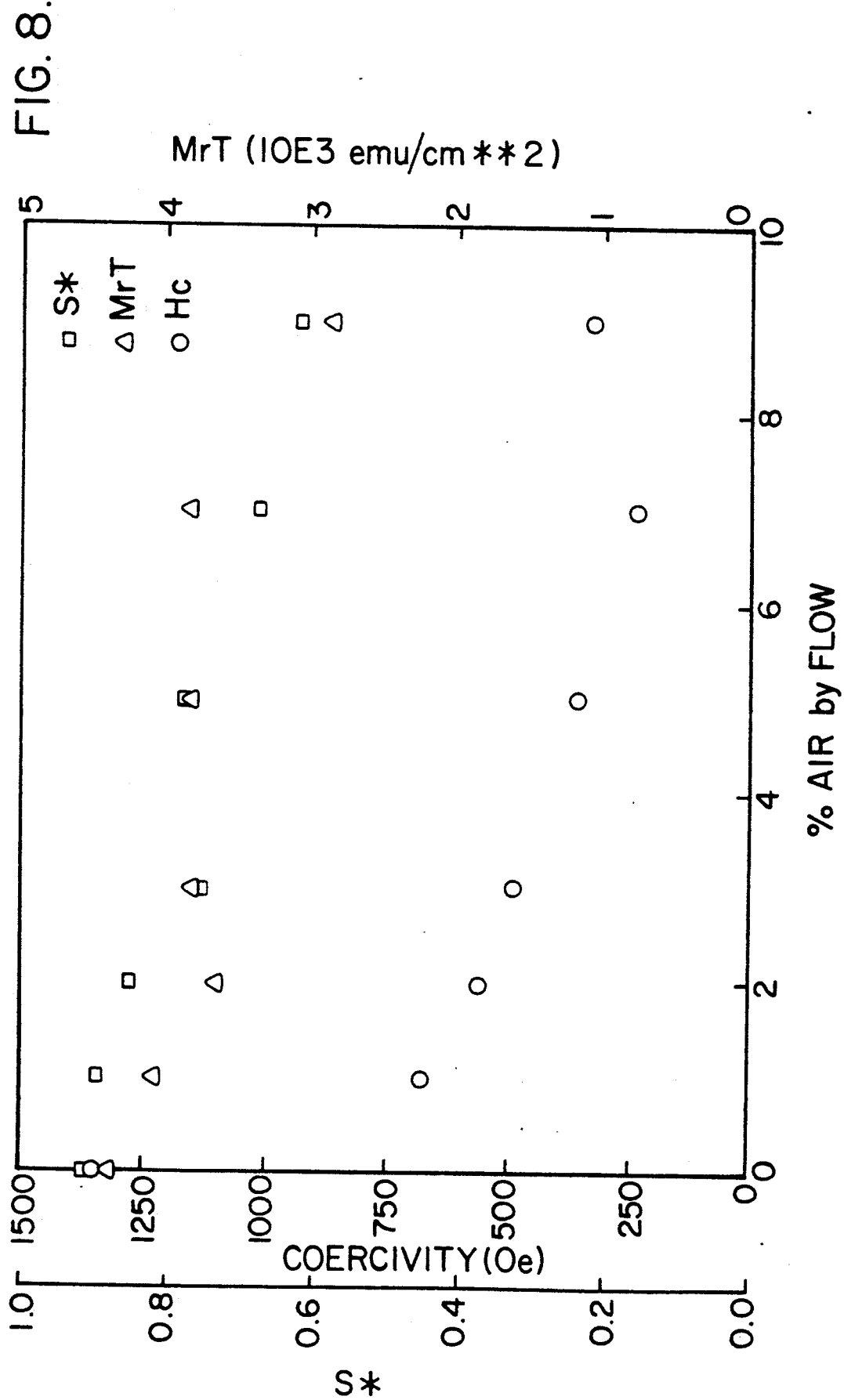
FIG. 8 is a graph similar to FIG. 3 that shows how the bulk magnetic properties (i.e. the Hc, MrT and S*) of the thin film magnetic recording film of FIG. 1 can be controlled by varying the air/argon ratio in the gas flow that enters the sputtering chamber of FIG. 2 during the deposition of the chromium based underlayer and the cobalt based thin film of FIG. 1.

FIG. 8 is a graph showing how the magnetic properties of cobalt based thin magnetic film 14 of FIG. 1 can be decreased in accordance with the invention by varying the air (i.e. a dry mixture of 20% oxygen and 80% nitrogen) dopant flow rate relative to 100 sccm flow rate of argon during the sputter deposition of chromium based underlayer 13 and during sputter deposition of magnetic layer 14 of FIG. 1. From this figure it can be seen that the control range of coercivity exists in substantially the entire portion of the coercivity curve. Within this control region, the coercivity of magnetic film 14 can be decreased by increasing the amount of purified air doping of the argon sputtering gas. In this case the magnetic film's MrT and S* characteristics also decreased.

Figure 9:
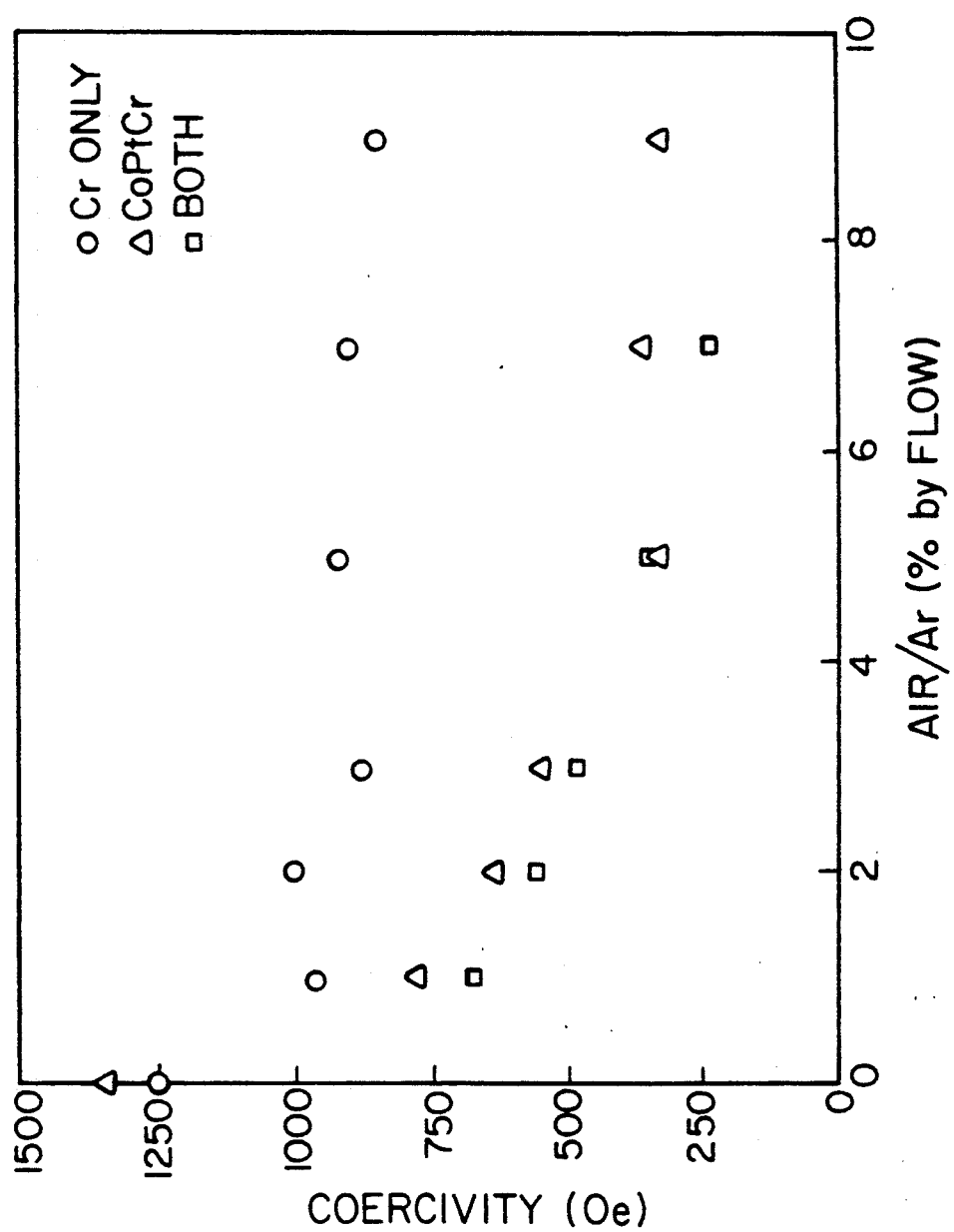
FIG. 9 is a graph similar to FIG. 6 that compares the coercivity of the cobalt based thin film of FIG. 1, (1) when only the chromium based underlayer is doped by varying the air/argon ratio in the gas flow that enters the sputtering chamber of FIG. 2, (2) when only the cobalt based thin film is doped by varying the air/argon ratio in the gas flow that enters the sputtering chamber of FIG. 2, and (3) when both the chromium based underlayer and the cobalt based thin film are doped by varying the air/argon ratio in the gas flow that enters the sputtering chamber of FIG. 2.

FIG. 9 compares the decrease in coercivity that is obtained by increasing the purified air doping percentage of the argon sputtering atmosphere (1) when depositing chromium based underlayer 13 while providing air doping, (2) when depositing cobalt based magnetic thin film 14 while providing air doping, and (3) when depositing underlayer 13 and then film 14, while providing air doping of both 13 and 14.

Another valuable utility of the present invention enables those skilled in the art to decrease the hysteresis loop squareness of magnetic layer 14 of FIG. 1, and to in that way tailor the bulk magnetic properties of layer 14 so as to match the properties that are required by a transducing head with which disk 10 will be used. This feature of the invention is shown in FIGS. 10-12.

Figure 10:
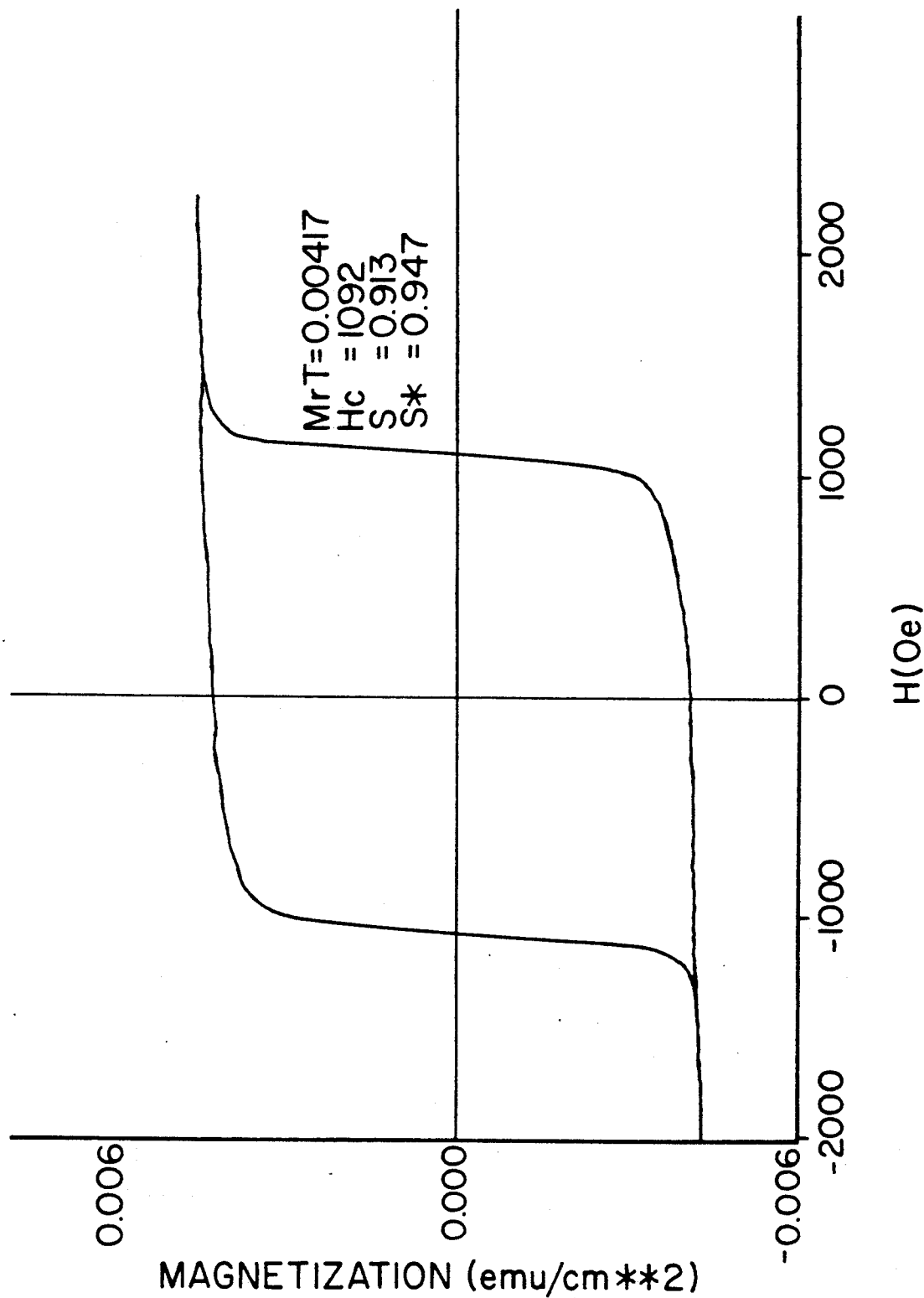
FIG. 10 shows an exemplary hysteresis loop of the magnetic thin film of FIG. 1 in the absence of using the invention, i.e. with the use of an undoped chromium based underlayer, for purposes of comparison to the use of the invention as shown in FIGS. 11 and 12.

FIG. 10 is a comparison hysteresis loop of a magnetic thin film of the general type shown FIG. 1, wherein the magnetic film is produced in the absence of using the invention. That is, the magnetic disk whose hysteresis loop is shown in FIG. 10 does not include use of a doped chromium based underlayer. FIG. 10 is presented for purposes of comparison to the use of the invention as is shown in FIGS. 11 and 12, this comparison showing how use of the invention produces reduced squareness of the film's hysteresis curve, again for the purpose of tailoring the bulk magnetic properties of film 14 so as to match the properties that are required by the transducing head with which disk 10 will be used.

Figure 11:
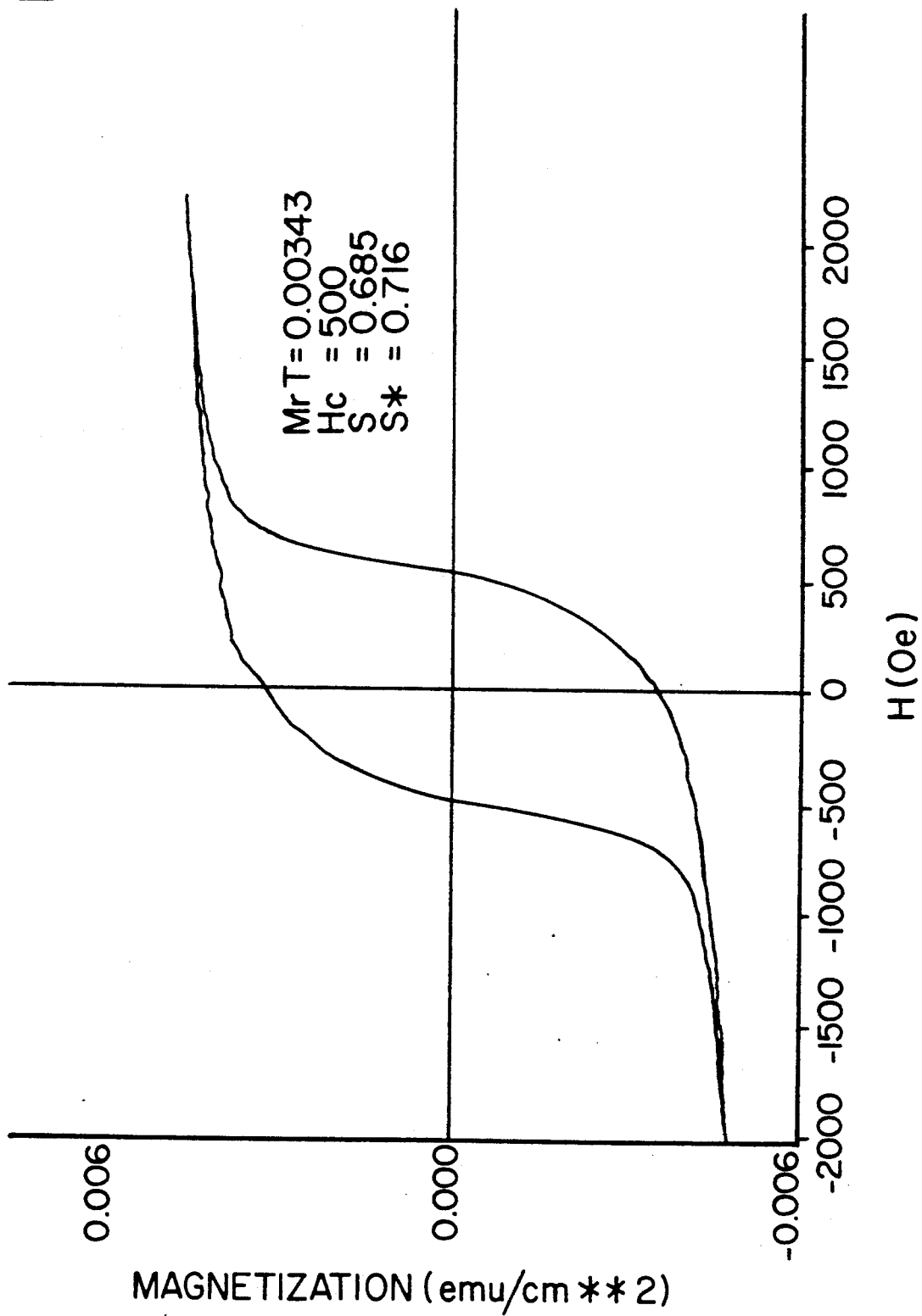
FIG. 11 shows a hysteresis loop of the magnetic thin film of FIG. 1 in the case where, in accordance with the invention, both the chromium based underlayer and the thin magnetic film of FIG. 1 are sputter deposited in the presence of a 3% nitrogen/argon atmosphere.

FIG. 11 shows the somewhat less square hysteresis loop, as compared to FIG. 10, of magnetic thin film of 14 in the case where, in accordance with the invention, both chromium based underlayer 13 and thin magnetic film 14 are sputter deposited in the presence of a 3% nitrogen, 97% argon atmosphere.

Figure 12:
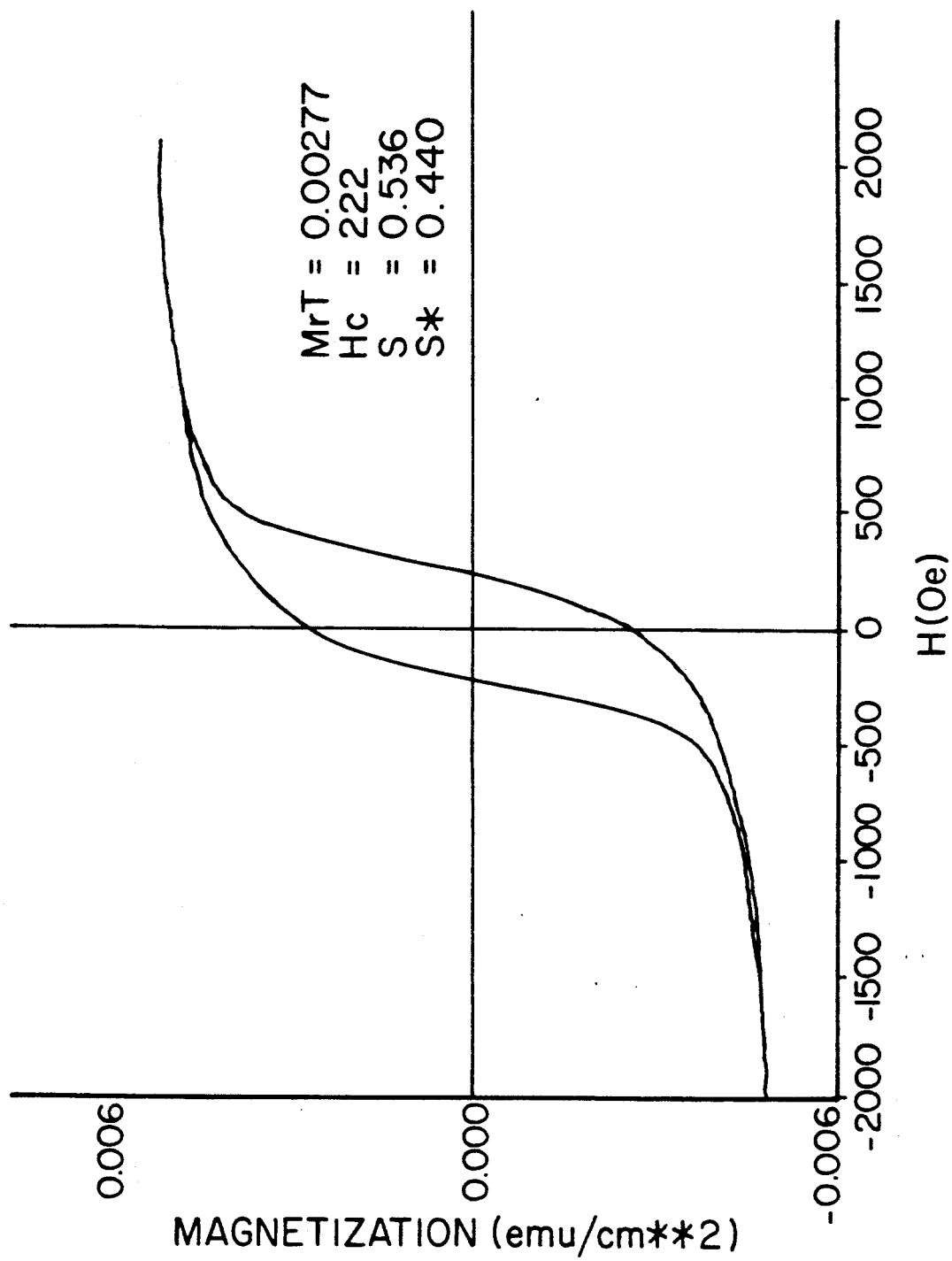
FIG. 12 shows a hysteresis loop of the magnetic thin film of FIG. 1 in the case where, in accordance with the invention, both the chromium based underlayer and the thin magnetic film of FIG. 1 are sputter deposited in the presence of a 7% nitrogen/argon atmosphere.

FIG. 12 shows the less square hysteresis loop of magnetic thin film 14 of FIG. 1 in a situation where, in accordance with the invention, both chromium based underlayer 13 and thin magnetic film 14 are sputter deposited in the presence of a 7% nitrogen, 93% argon atmosphere.

Figure 13:
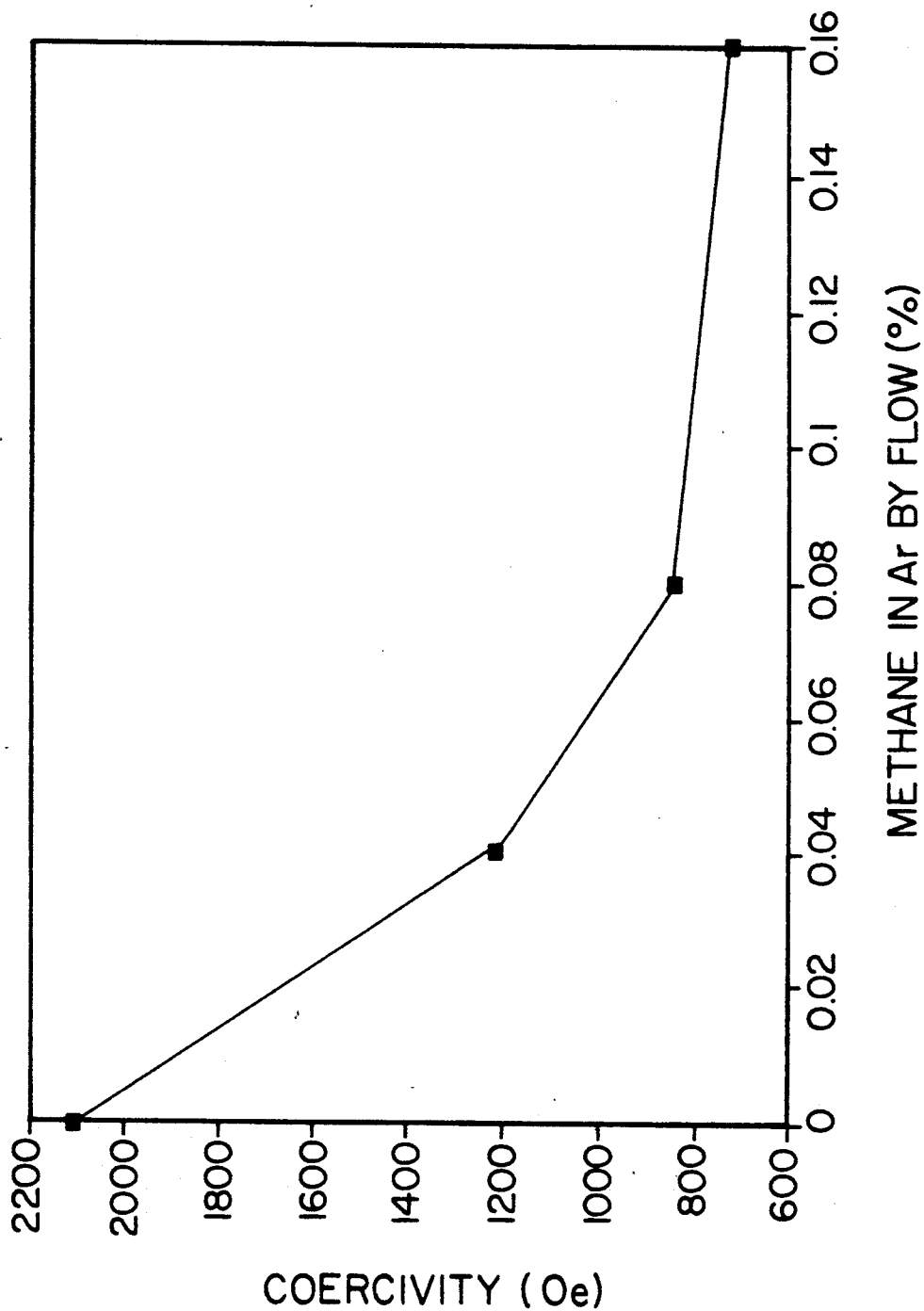
FIG. 13 is a graph that shows how the coercivity of the thin film magnetic recording layer of FIG. 1 can be controlled by varying the doping percent of methane in argon during the deposition of the chromium based underlayer and the cobalt based thin film recording layer of FIG. 1.

FIG. 13 shows how the coercivity of the thin film magnetic recording layer 14 of FIG. 1 is effected by varying the doping percent of methane in argon during the deposition of both chromium based underlayer 13 and cobalt based thin film 14. As shown, the process compatible dopant methane is effective in reducing coercivity when used in both underlayer 13 and recording layer 14.

Figure 14:
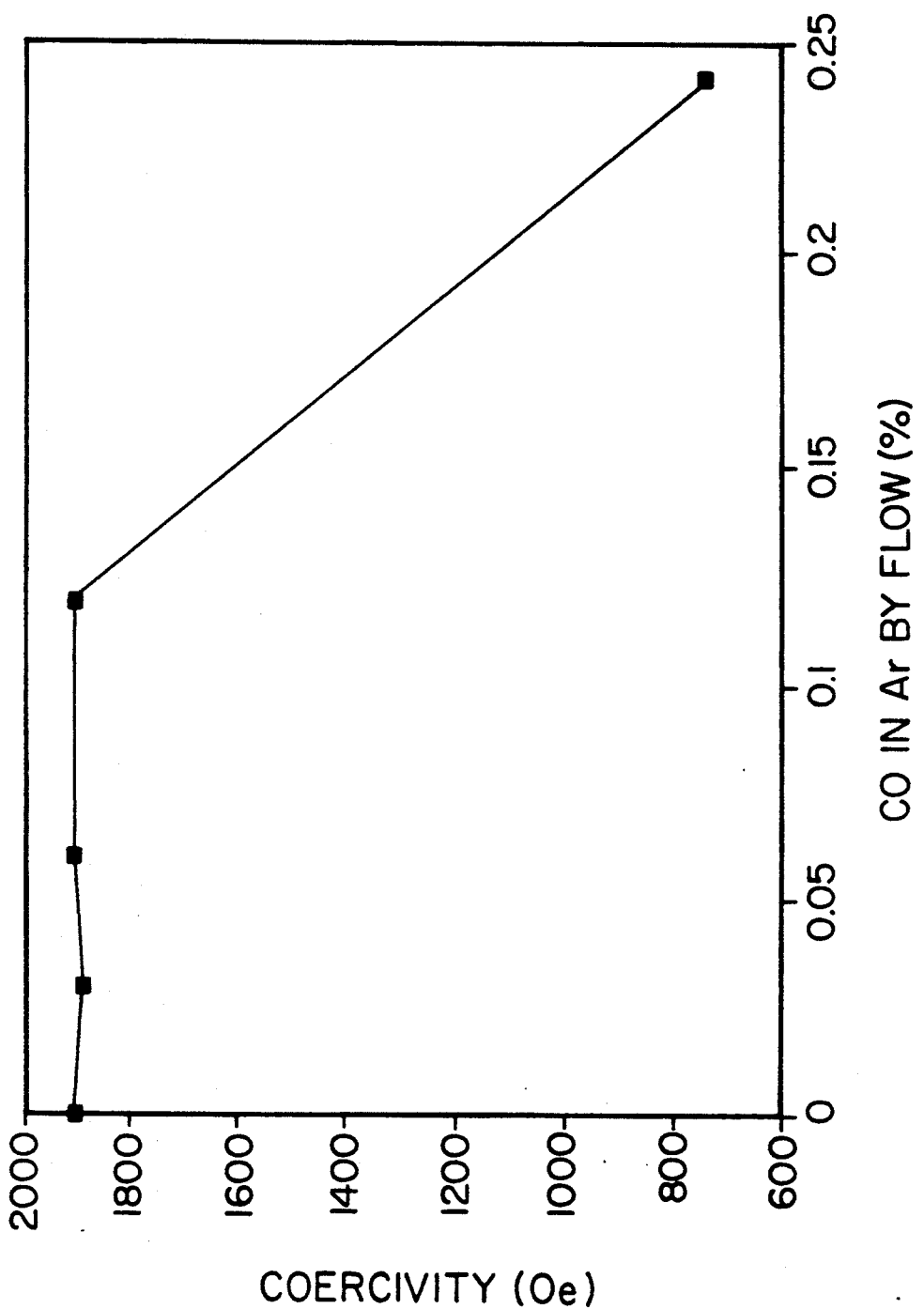
FIG. 14 is a graph that shows how the coercivity of the thin film magnetic recording layer of FIG. 1 can be controlled by varying the doping level percent of carbon monoxide in argon during the deposition of the chromium based underlayer and the cobalt based thin film recording layer of FIG. 1, and FIGS. 15, 16 and 17 show the control of the thin magnetic recording film's coercivity, magnetic remanence, and coercive squareness, respectively, where carbon monoxide and methane dopant gases, respectively, are used during deposition of the chromium based underlayer of FIG. 1.

FIG. 14 shows that the use of carbon monoxide as the process compatible dopant is also effective in controlling recording layer coercivity. As will be appreciated by those of skill in the art, the use of carbon dioxide will produce the same general effect. In FIG. 14, the indicated percentage of CO in argon was used during the deposition of both chromium based underlayer 13 and cobalt based (i.e. Co/Pt/Cr) thin film 14.

Figure 15:
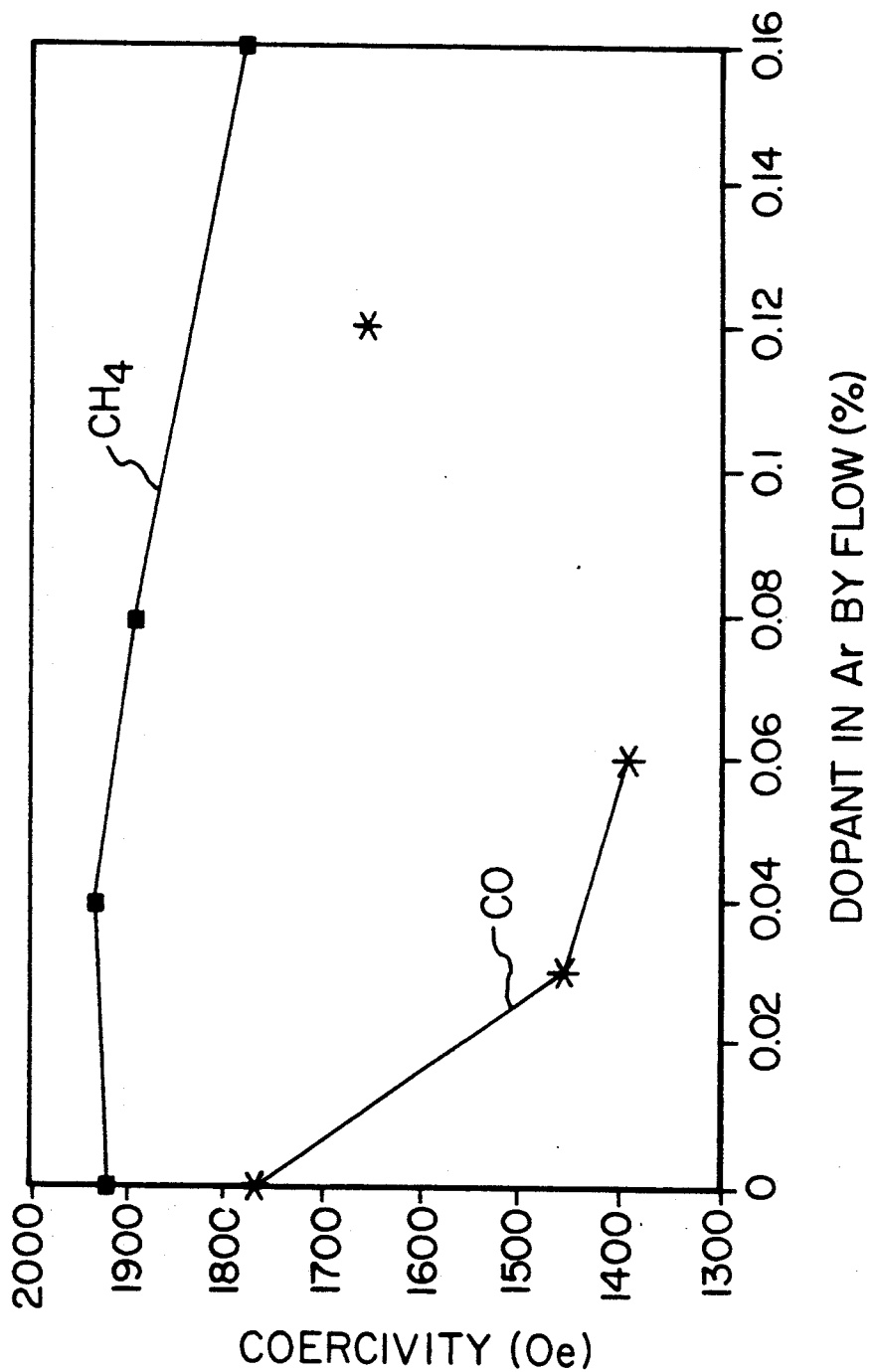
Figure 16:
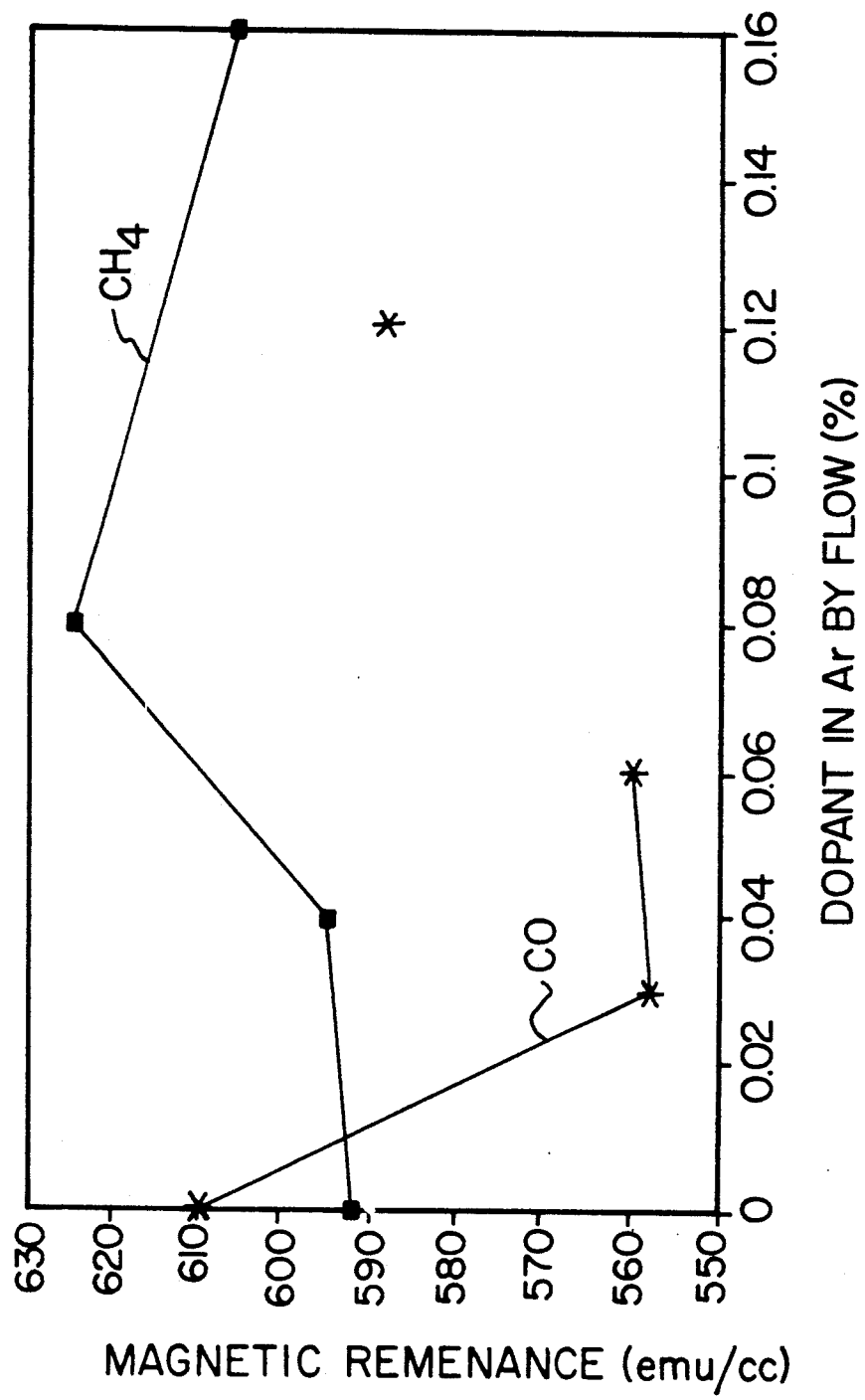
Figure 17:
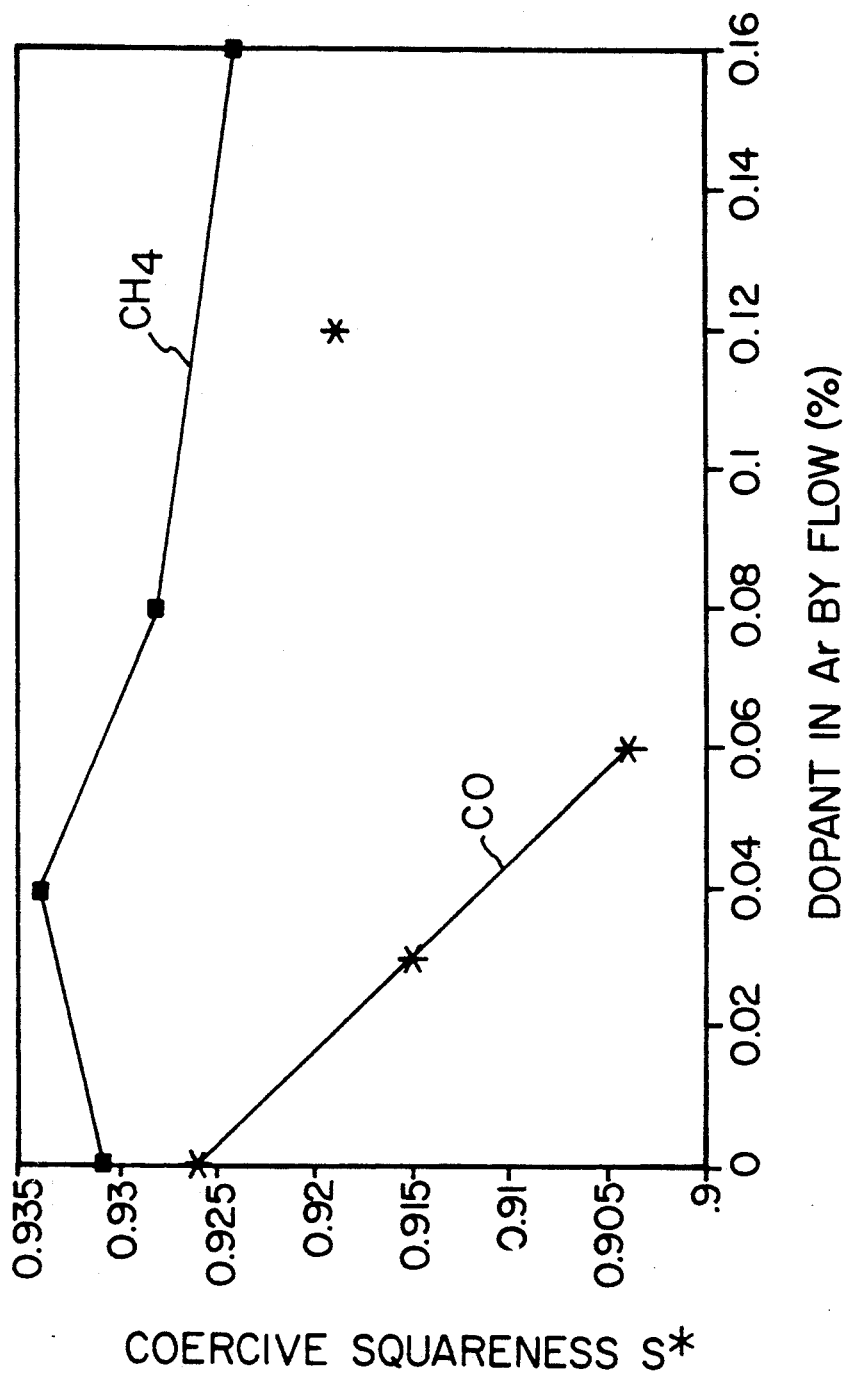

FIGS. 15-17 show the magnet effects that occur in recording layer 14 when underlayer 13 is doped with carbon monoxide and methane, respectively. Again, the effects shown in these figures for carbon monoxide will be generally duplicated when carbon dioxide is used the process compatible dopant. In FIGS. 15-17, the indicated percentages of the dopants CO and $CH_4$ in argon were used during the deposition of only chromium based underlayer 13.

It should be noted from FIGS. 15-17 that high doping levels of CO in argon, that is generally above 0.06 percent, tend to cause an increase in the graph's indicated magnetic effect.

As is apparent from the above detailed description of embodiments of the invention, the invention provides reliable and repeatable means for controlling the magnetic properties of a thin film magnetic recording disk by the introduction of a process compatible dopant gas, gases or vapor during the sputter deposition process by which an underlayer for the disk's magnetic film is deposited in the presence of an argon atmosphere. Subsequently, the magnetic film is sputter deposited onto this doped underlayer. The magnetic film may also be deposited in the presence of a dopant gas, gases or vapor.

The invention has been described in detail by making reference to several embodiments thereof. Those skilled in the art will, upon learning of the invention, readily visualize yet other embodiments that are within the spirit and scope of the invention. Thus it is intended that the invention be as is defined by the claims.

What is claimed is:

1. A method of controlling the magnetic properties of a thin film magnetic recording layer, comprising the steps of,
    providing substrate means,
    vacuum depositing a chromium based underlayer on said substrate means, said underlayer being doped with a process compatible dopant gas that contains oxygen, nitrogen and/or carbon, and mixtures thereof,
    controlling the amount of said dopant gas that is used during said vacuum deposition of said chromium based underlayer in a manner to control the magnetic properties of a thin film magnetic layer to be vacuum deposited on said chromium based underlayer, and
    vacuum depositing said thin film magnetic recording layer on said chromium based underlayer.

2. The method of claim 1 wherein said process compatible dopant gas is selected from the group oxygen, nitrogen, a mixture of oxygen and nitrogen, carbon monoxide, carbon dioxide, methane and water vapor.

3. The method of claim 2 wherein the step of depositing said chromium based underlayer comprises sputter depositing said chromium based underlayer onto said substrate means in the presence of argon gas and said selected dopant gas.

4. The method of claim 3 wherein said sputter depositing step comprises the step of sputter depositing said chromium based underlayer from a high purity target.

5. The method of claim 4 wherein said target is selected from the group Cr, CrW, CrV and CrNb.

6. The method of claim 5 wherein said thin film magnetic recording layer is a cobalt based recording layer.

7. The method of claim 6 wherein said cobalt based recording layer is selected from the group Co/Pt/Cr, Co/Ta/Cr, Co/Ni/Cr and Co/Ta/Pt/Cr.

8. The method of claim 2 wherein said step of controlling the amount of said dopant gas is for the purpose of increasing the coercivity of said thin film magnetic recording layer, and wherein said dopant gas is oxygen or water vapor.

9. The method of claim 2 wherein said step of controlling the amount of said dopant gas is for the purpose of decreasing the coercivity of said thin film magnetic recording layer, and wherein said dopant gas is selected from the group nitrogen, a mixture of oxygen and nitrogen, carbon monoxide, carbon dioxide and methane.

10. The method of claim 2 wherein said step of controlling the amount of said dopant gas is for the purpose of decreasing the hysteresis loop squareness of said thin film magnetic recording layer, and wherein said dopant gas is selected from the group nitrogen, air, carbon monoxide, carbon dioxide and methane.

11. The method of claim 1 wherein the step of depositing said thin film recording layer comprises sputter depositing said thin film layer onto said chromium based underlayer in the presence of an undoped argon gas.

12. The method of claim 1 wherein the step of depositing said thin film recording layer comprises sputter depositing said thin film layer onto said chromium based underlayer in the presence of argon gas and a dopant gas that contains oxygen, nitrogen and/or carbon, and mixtures thereof.

13. The method of claim 1 wherein said step of controlling the amount of said dopant gas is for the purpose of decreasing the hysteresis loop squareness of said thin film magnetic recording layer, and wherein the step of depositing said thin chromium based underlayer and the step of depositing said thin film recording layer comprise depositing said underlayer and said thin film layer in the presence of argon gas and a nitrogen dopant gas.

14. The method of claim 13 wherein said argon gas and said nitrogen dopant gas comprise a mixture in the range of from about 3 percent to about 7 percent nitrogen.

15. A method of manufacturing a rigid magnetic recording disk, comprising the steps of;
    providing a rigid disk shaped nonmagnetic substrate member,
    providing a sputter deposition chamber,
    providing a chromium based target in said chamber, and using said chamber to sputter deposit a thin chromium based underlayer on said substrate member, said underlayer being sputter deposited onto said substrate member in the presence of argon gas and a process compatible dopant gas that contains oxygen, nitrogen and/or carbon,
    providing a cobalt based target in said chamber, and using said chamber to sputter deposit a thin cobalt based magnetic recording film on said underlayer, and
    controlling the amount of said dopant gas that is used during said sputter deposition of said thin chromium based underlayer in a manner to control the magnetic properties of said thin cobalt based magnetic recording film.

16. The method of claim 15 wherein said process compatible dopant gas is selected from the group oxygen, nitrogen, a mixture of oxygen and nitrogen, carbon monoxide, carbon dioxide methane and water vapor.

17. The method of claim 16 wherein prior to deposition of said underlayer and said magnetic film, said chamber is evacuated to a base pressure of generally less than $1 \times 10^{-6}$ torr, and said chamber is then back filled with said argon gas and said selected dopant gas to a pressure in the range of about 4 to 50 mtorr, and wherein during said deposition a temperature in the range of about 100 to 210 degrees C. is provided.

18. The method of claim 17 including the steps of providing said targets as HIPED targets, and providing about 1 kwatt power to said targets during deposition of said underlayer and said magnetic film.

19. The method of claim 18 wherein the rate of deposition of said underlayer and said magnetic film is in the range of about 500 to about 3,000 angstroms per minute.

20. The method of claim 19 wherein the rate of deposition of said underlayer and said magnetic film is about 1000 angstroms per minute.

21. The method of claim 19 wherein said underlayer is about 250 angstroms thick, and wherein said magnetic film is about 650 angstroms thick.

22. The method of claim 21 including the step of providing said nonmagnetic substrate member with a NiP coating having a textured surface.

23. The method of claim 22 including the step of degassing said NiP coated substrate member prior to sputter disposition of said underlayer.

24. The method of claim 23 wherein said chromium based underlayer is about 250 angstroms thick and is selected from the group Cr, CrW, CrV and CrNb, and wherein said cobalt based magnetic film is about 650 angstroms thick and is selected from the group Co/Pt/Cr, Co/Ta/Cr, Co/Ni/Cr and Co/Ta/Pt/Cr.

25. The method of claim 24 including the steps of providing a carbon based overcoat film on said magnetic film, and providing a lubricant film on said overcoat film.

* * * * *